United States Patent
Jowett et al.

(10) Patent No.: US 7,162,390 B2
(45) Date of Patent: Jan. 9, 2007

(54) FRAMEWORK FOR COLLECTING, STORING, AND ANALYZING SYSTEM METRICS

(75) Inventors: Alan T. G. Jowett, Redmond, WA (US); Balaji Santhanam, Bellevue, WA (US); Ravishankar V. Sathanur, Bellevue, WA (US); Sivaprasad V. Padisetty, Redmond, WA (US); Thirumalesh K. Bhat, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 72 days.

(21) Appl. No.: 11/027,708

(22) Filed: Dec. 30, 2004

(65) Prior Publication Data
US 2006/0161387 A1    Jul. 20, 2006

(51) Int. Cl.
*G21C 17/00* (2006.01)
(52) U.S. Cl. ...................................... 702/182
(58) Field of Classification Search ............... 702/182, 702/81; 700/174, 178
See application file for complete search history.

(56) References Cited

U.S. PATENT DOCUMENTS

2003/0195718 A1* 10/2003 Crowder, Jr. ............... 702/183
2004/0078720 A1*  4/2004 Ito et al. ....................... 714/45

OTHER PUBLICATIONS

Pearson versus Spearman, kendall's TAU correlation analysis, Dec. 2006, p. 179-200.*
Merriam-Webster's dictionary Tenth edition, 1993, p. 695.*

* cited by examiner

*Primary Examiner*—Michael Nghiem
*Assistant Examiner*—Tung S. Lau
(74) *Attorney, Agent, or Firm*—Christensen O' Connor Johnson Kindness PLLC (57) ABSTRACT

The invention provides a framework for collecting, storing, and analyzing system metrics concerning a computing system or a computer component. A configuration module is provided to configure settings specific to a metric. A data collection module is provided to collect metric data according to the settings in the configuration module and in one or more component specific plug-ins that extend and customize the framework according to specific needs of the component. The data collection module collects metrics at specified time intervals and periodically updates metric data stored in a central metrics storage module. An analysis module is provided to analyze metric data stored in the central metrics storage module online or offline. The analysis module may analyze a metric statistically or graphically, individually or combined with other metrics.

15 Claims, 8 Drawing Sheets

FRAMEWORK FOR COLLECTING, STORING, AND ANALYZING SYSTEM METRICS

FIELD OF THE INVENTION

This invention relates generally to computer system performance studies, and more particularly to the collecting and analyzing of computer system performance data.

BACKGROUND OF THE INVENTION

Nowadays, a computer system has evolved into a complicated combination of multiple software and hardware components for performing various functions and supporting various features. To obtain optimal performance of a computer system, continuous monitoring of the performance of the computer system and/or its components is necessary.

Continuous studies of component performance are necessary, not only in operating an existing computer system, but also in developing computer software and hardware components. For example, when developing an operating system, such as the Microsoft® Windows® XP operating system, development teams of various components of the operating system constantly stress test the various components. Stress testing is the process of subjecting a component to strenuous operating conditions and observing whether the component can withstand heavy usage without failure. Stress testing thus helps a component development team to identify any weakness or defect in the component and can provide valuable information as to the causes of a failure if meaningful data are collected during the stress testing process.

Therefore, an effective study of system performance should be able to collect meaningful data regarding the operating characteristics of a component and make the data easily accessible. During stress testing or other performance studies, a component may have a number of statistical variables that are of interest and should be tracked. For a computer system component, such statistical variables can capture the usage and information with regard to system memory, CPU, event log, etc., in the component. The collected data can then be used to identify the status of the component and diagnose problems in the component. Conventionally, such statistical data concerning a component in a computer system is called a metric.

Conventional approaches in capturing metrics usually provide static snapshots of the current status of a component performing a task such as stress testing. However, a static snapshot fails to reflect changes of a metric over time. Moreover, conventional approaches usually collect metrics that are specific for an individual computer system or component, rather than metrics that are common to different computer systems or components. Thus, conventional approaches fail to reveal how the same metric may vary in different computing environments. Further, collected metrics are usually stored as a text report, which provides a user little flexibility or variation in presenting metric data.

Furthermore, different component teams may store collected metrics in different formats and in different locations, rather than in a uniform format and at a centralized location that everyone can access and use. As a result, metric data provided by one component team often cannot be easily integrated with metric data provided by other component teams, therefore making it difficult to establish consistent system evaluation of different components.

Therefore, there exists a need to collect any system metric during run time of a component in a predefined format, and to store the system metric in a way so as to enable analyzing of either the individual metric or a combination of metrics, either offline or online.

SUMMARY OF THE INVENTION

This invention addresses the above-identified need by providing a framework to collect any system metrics during run time in a predefined format and to store the system metrics in a way so as to enable the analysis of either an individual metric or a combination of metrics, online or offline. The invention enables development teams to record vital systems and any other performance metrics at any given interval and to analyze trends in each of the metrics with regard to time.

One aspect of the invention provides multiple computer-executable modules: a configuration module, a data collection module, a central metrics storage module, and preferably an analysis module. A configuration module configures one or more metrics. The configuration module includes a configuration file and preferably a user interface through which a user may configure one or more metrics (hereinafter "configuration UI"). The configuration file specifies the name of a metric and a log file on a client system for recording metric data during run time of the client system. The configuration file also specifies a time interval for periodically collecting metric data and uploading them to the central metrics storage module, which can be a central database for storing all metric data. The configuration file further specifies the type of information contained in a metric. A metric may include events occurring during the run time of a client system. A metric may also include performance counters or data on drivers on the client system. A metric may further include one or more processes running on the client system.

According to settings in the configuration model, the data collection module collects one or more metrics concerning one or more computer components on one or more client systems. The data collection module sends the collected metric data to the central metrics storage module that centrally stores all metric data. The central metrics storage module may format the received metric data prior to storing them.

Preferably, the invention also provides an analysis module that analyzes the stored metric data online or offline. The analysis module may analyze the metric data statistically or chart one or more metrics graphically to show the pattern over time. The analysis module may further include a user interface (hereinafter "analysis UI"), through which a user analyzes and/or graphs stored metric data.

Another aspect of the invention extends and customizes the functionalities provided by the above-mentioned modules with one or more component specific plug-ins. A component specific plug-in can be a configuration UI plug-in, a data collection plug-in, or an Intelligent Pass/Fail plug-in (hereinafter "IPF plug-in"). A configuration UI plug-in extends the configuration UI with component specific configuration information. A data collection plug-in extends and customizes the data collection module.

An IPF plug-in includes both an IPF client plug-in and an IPF UI plug-in. The IPF client plug-in receives collected metric data from the data collection module and decides whether the metric data meet one or more criteria in the IPF client plug-in. If the collected metric data do not meet the criteria in the IPF client plug-in, the IPF client plug-in returns a value indicating a failure; the data collection module then discontinues collecting the metric and exits the task that generates the metric data collected (hereinafter "metric task"). If the metric data meet the criteria in the IPF client plug-in, the IPF client plug-in returns a value indicating a pass; the data collection module then continues collecting the metric.

In summary, the invention provides a framework that collects, stores, and analyzes metric data concerning a client system or component. Component development teams can use the framework to monitor and improve component performance, scalability, and reliability. IT professionals can use the framework to build critical system monitoring tools for monitoring the health of infrastructure servers.

BRIEF DESCRIPTION OF THE DRAWINGS

The foregoing aspects and many of the attendant advantages of this invention will become better understood by reference to the following detailed description, when taken in conjunction with the accompanying drawings, wherein.

DETAILED DESCRIPTION OF THE PREFERRED EMBODIMENT

Embodiments of the invention provide a framework for collecting metrics during run time of a client system or component in a predefined format and for storing the metrics in a way so as to be able to analyze either an individual metric or a combination of metrics online or offline. The invention thus records vital system and other performance metrics at given intervals and analyzes trends in the metrics with regard to time.

In general, a metric is an abstract term referring to any one of system performance counters, system resource usage information, etc. A metric usually consists of a name and an associated value. For example, in a Microsoft Windows® operating system, one of the system metrics is the usage of memory by various system processes such as winlogon.exe, service.exe, etc. An exemplary embodiment of the invention defines the winlogon.exe process with the "metric name" as "winlogon.exe/paged pool bytes" and "metric value" as the actual paged pool memory bytes used by the winlogon.exe process.

Figure 1:
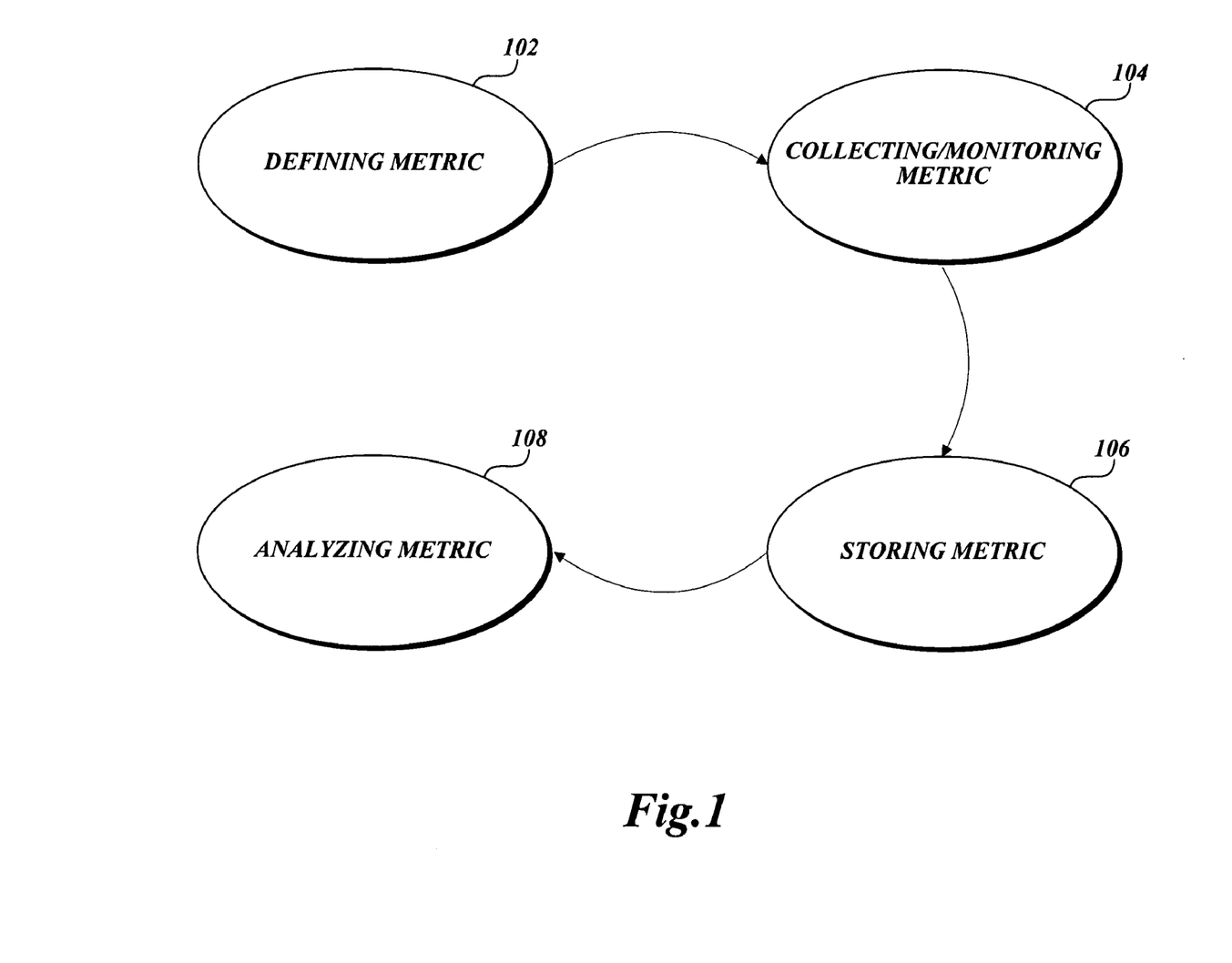
FIG. 1 is a block diagram illustrating exemplary phases in the invention.

Exemplary embodiments of the invention contain multiple phases: defining a metric, collecting and/or monitoring the metric, storing the metric, and/or analyzing the metric. FIG. 1 is a block diagram illustrating these multiple phases. In a "defining metric" phase 102, the invention defines any system run time information as a metric name/value pair and configures the settings for each metric.

In a "collecting/monitoring metric" phase 104, the invention collects the defined metrics during run time of a client system or component at defined time intervals. Preferably, the invention also monitors the collected metric data. The invention may perform an independent action, such as stopping executing the relevant metric task when an individual metric does not meet one or more specified criteria. The one or more criteria for taking certain actions can be applicable to an individual metric or a combination of metrics.

In a "storing metric" phase 106, the invention stores collected metrics in a central database in a defined format. The invention thus enables proper archiving of all metrics for any future use, such as analyzing them to find trends in system behavior over time.

Preferably, the invention further includes an "analyzing metric" phase 108, during which the invention retrieves the stored metrics for both online and offline analysis. Analysis of metrics may include charting trends of individual or collective metrics on individual or collective client systems. These charts can then be used to improve scalability, performance, and reliability of individual components by different component development teams.

Figure 2:
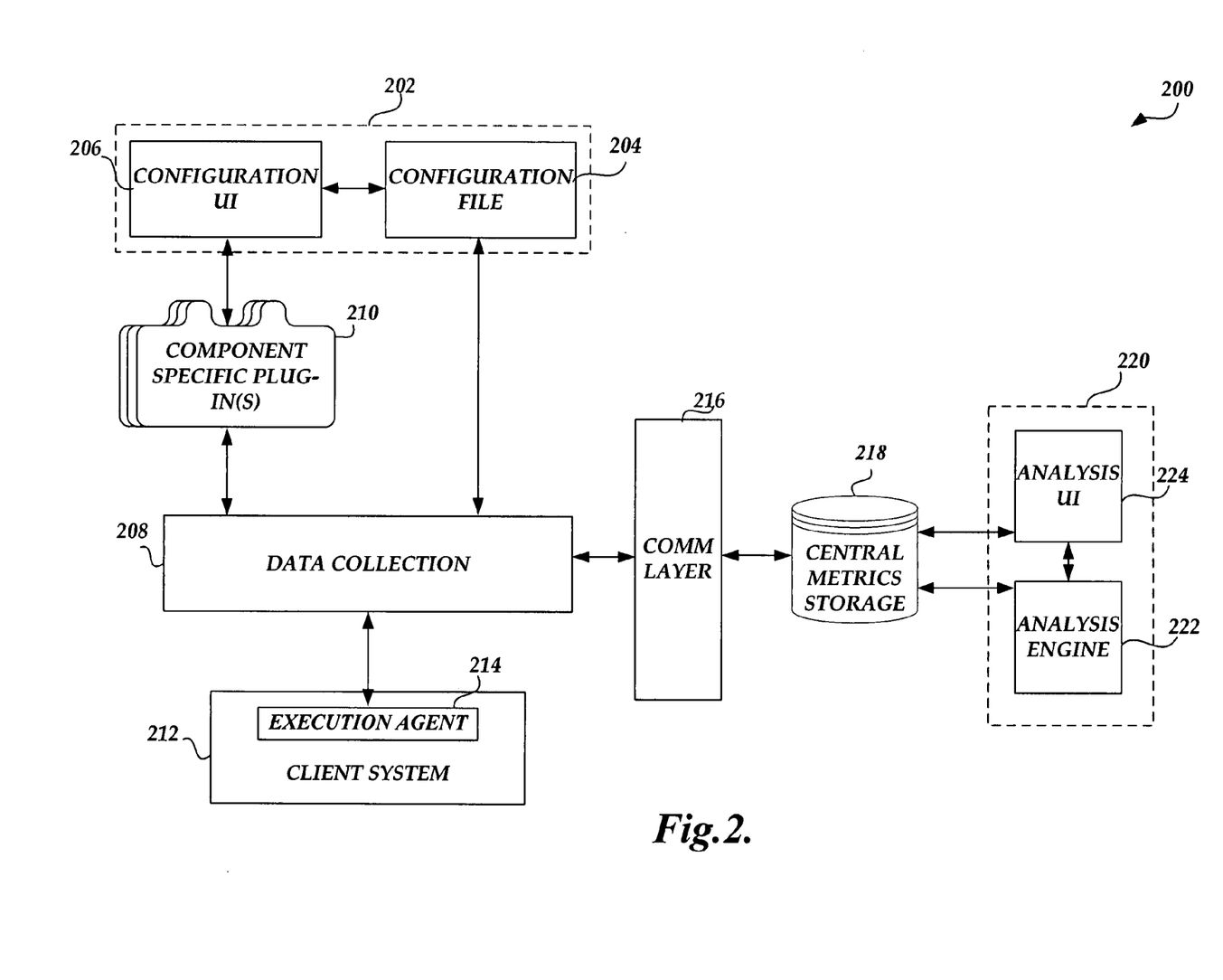
FIG. 2 is a block diagram illustrating an exemplary architecture of the invention, implementing the phases of the invention illustrated in FIG. 1.

Embodiments of the invention provide an architectural framework for implementing the functionalities provided by the multiple phases of the invention, such as the phases illustrated in FIG. 1. FIG. 2 is a block diagram illustrating an exemplary framework 200. Different modules in the framework 200 perform the functionalities provided by the multiple phases of the invention.

The framework 200 includes a configuration module 202, a data collection module 208, a central metrics storage module 218, and, preferably, an analysis module 220. In addition, the framework 200 may further include one or more component specific plug-ins 210 that extend and customize the framework 200. As illustrated in FIG. 2, the data collection module 208 reads setting information from the configuration module 202, and preferably interacts with one or more component specific plug-ins 210, to collect one or more metrics on one or more client systems 212. In some embodiments of the invention, the data collection module 208 interacts with an execution agent 214 on a client system 212 to obtain information on the job that a metric task runs under. The execution agent 214 links the metric with the job running on the client system 212. The data collection module 208 then sends, via a communication layer 216, collected metric data to a central metrics storage 218. If an analysis module 220 exists, the analysis module 220 can analyze the metrics after retrieving one or more metrics from the central metrics storage 218 at any time, i.e., during or outside the run time of the client systems 212.

Specifically, the configuration module 202 configures settings for one or more metrics. In embodiments of the invention, the configuration module 202 includes a configuration file 204 and preferably a configuration UI 206. The configuration file 204 contains the settings for each individual metric. For example, the configuration file 204 defines the name of a metric, the log file for storing collected metrics on a client system, and the time interval of updating the collected metrics to the data storage module 218.

The configuration file 204 further specifies what a metric contains. In embodiments of the invention, a metric can be different types of events generated by a client system or component. A metric can also be a performance counter that records status information about various system devices or processes. A metric can further be any of the available driver data such as PoolTags on the client system that provide information on how drivers use available system resources. A metric can also be any of the available processes running on a client system.

Figure 5:
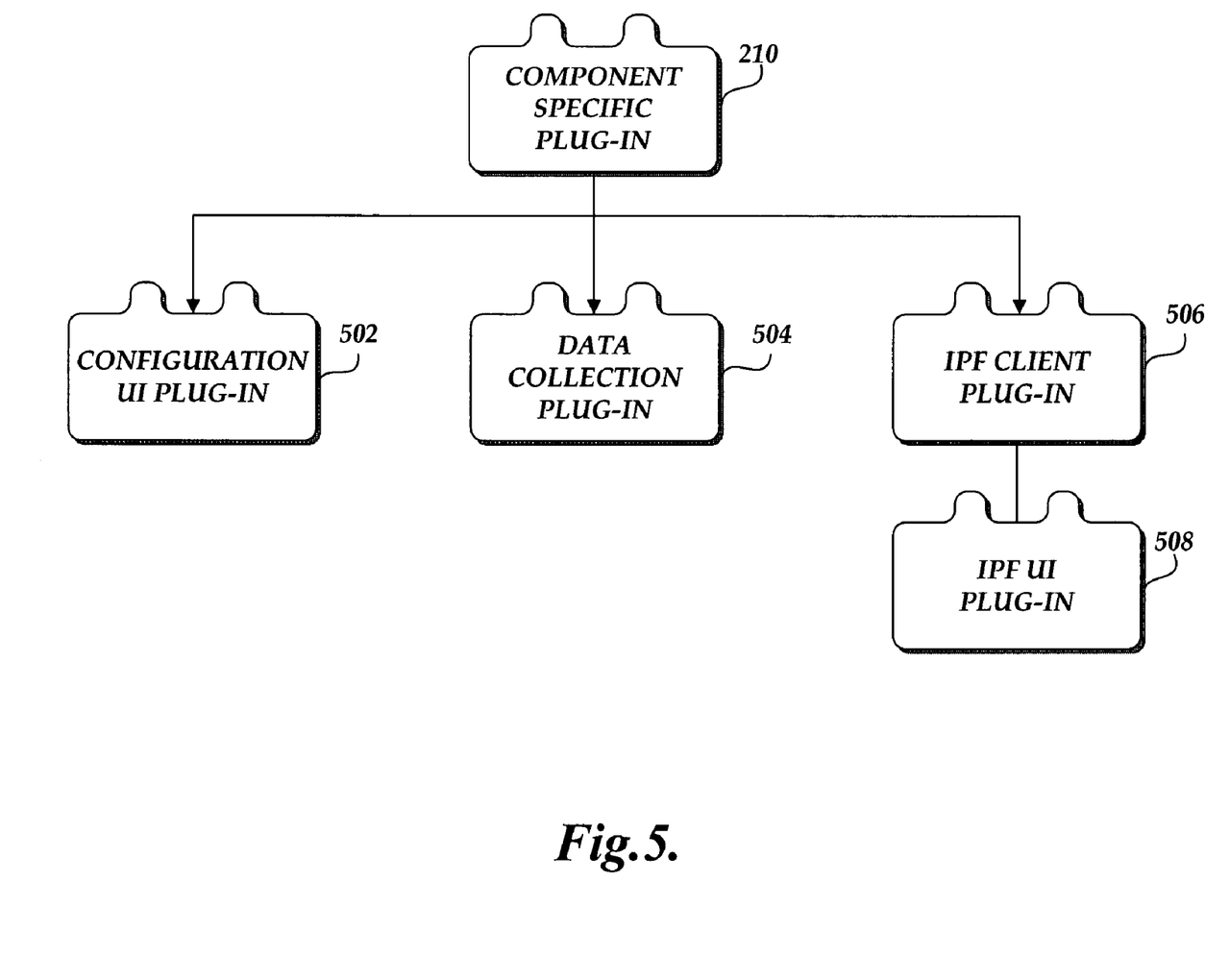
FIG. 5 is a block diagram illustrating exemplary component specific plug-ins.

In addition, the configuration file 204 also identifies one or more component specific plug-ins 210 associated with a metric. As noted above, a component specific plug-in 210 extends and customizes the framework 200 in collecting one or more metrics. FIG. 5 illustrates exemplary component specific plug-ins 210 and will be discussed in detail later. As noted above, according to the settings in the configuration file 204, the data collection module 208 collects a metric and updates the central metrics storage module 218 periodically.

Figure 3A:
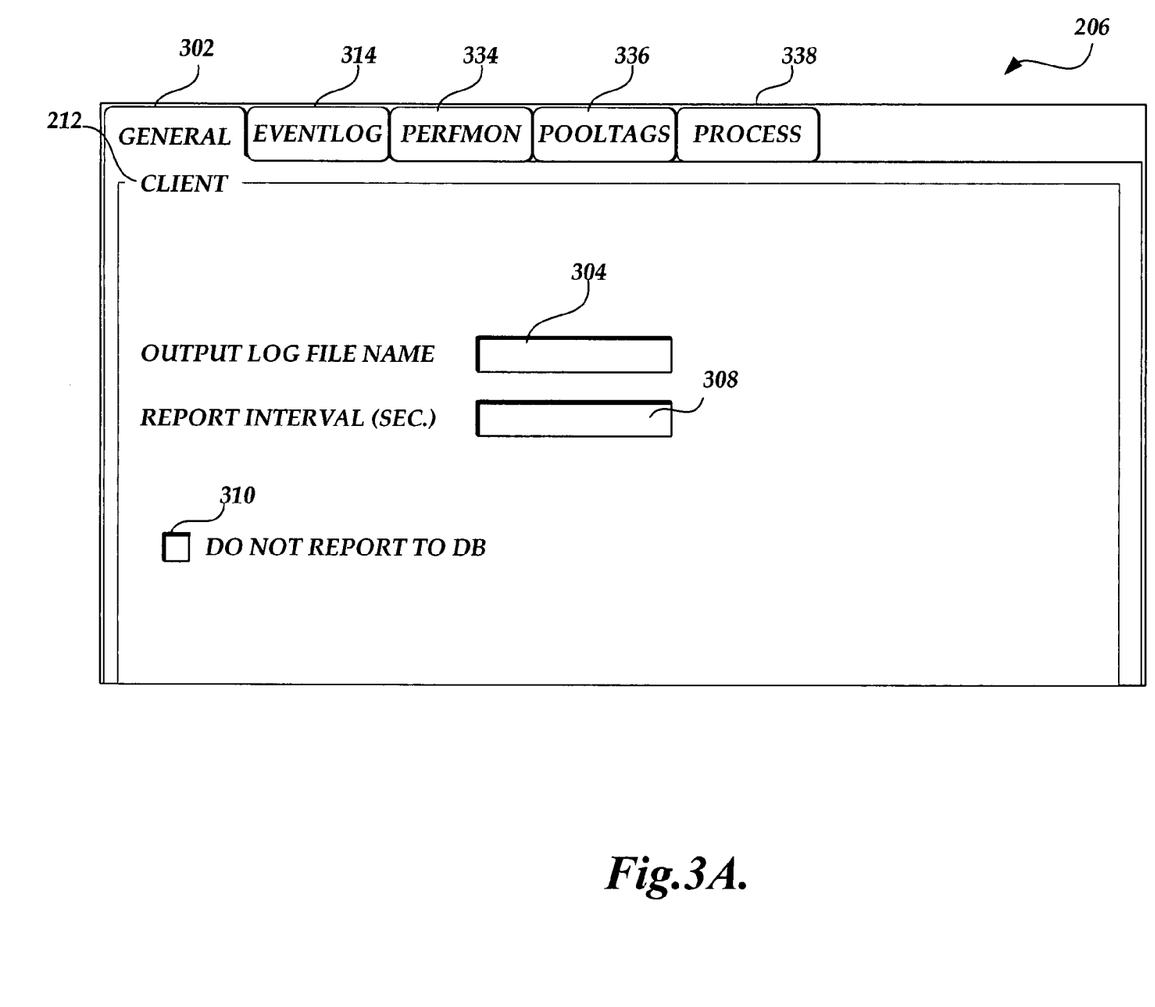
FIGS. 3A–3B are pictorial diagrams illustrating exemplary sections contained in a configuration UI.
Figure 3B:
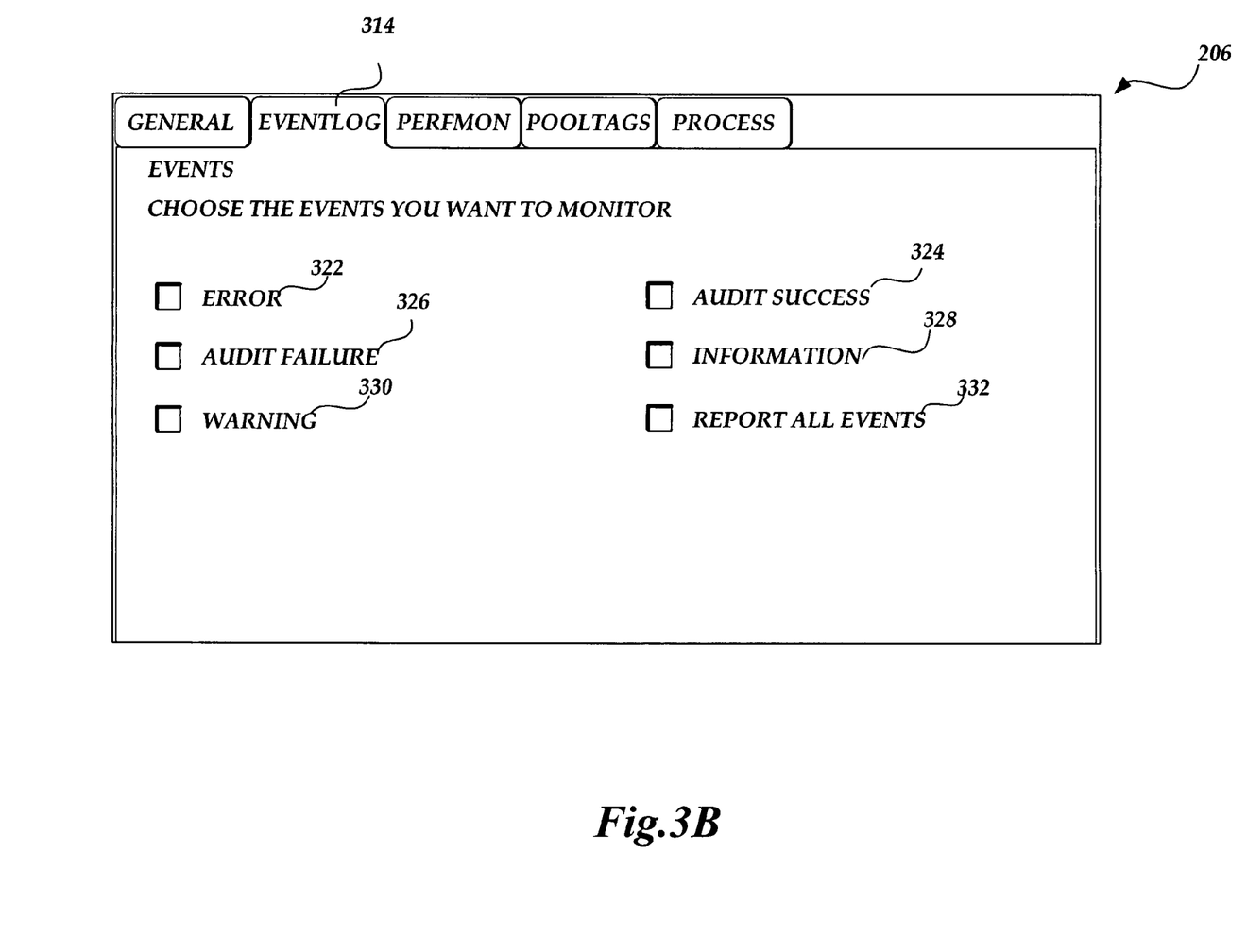

In some embodiments of the invention, the configuration module 202 further includes a configuration UI 206 that enables a user to configure one or more metrics via the user interface. The configuration UI 206 outlines the setting requirements of the configuration file 204. A user's input to the configuration UI 206 is deposited into the configuration file 204. FIGS. 3A–3B illustrate one exemplary configuration UI 206. The configuration UI 206 contains individual sections logically grouping the various settings concerning a metric. These individual sections appear as individual tabbed pages in the configuration UI 206.

Specifically, the configuration UI 206 contains a general section 302 (FIG. 3A). The general section 302 identifies the name 304 of an output log file on a client system 212. The output log file 304 stores collected metrics on the client system 212. The general section 302 allows a user to specify a report interval 308 for collecting metric data on the client system 212, storing the metric data in the output log file 304, and reporting the metric data to a central metrics storage module 218 (FIG. 2). The general section 302 may further provide a "Do Not Report to DB" check box 310. The actuation of the check box 310 disables the periodical sending of metric updates to the central metrics storage module 218; the collected metric data remains locally in the output log file 304 on the client system 212.

The configuration UI 206 also contains sections for specifying what information one or more metrics may include. As noted above, a metric may be any of the events occurring during the run time of a client system 212, performance counters, driver PoolTags, and processes on the client system 212. The configuration UI 206 includes an event log section 314 (FIG. 3B) to set configurations for copying events from the event logs of a client system 212 and forwarding them to the central metrics storage module 218. The event log section 314 enables a user to choose to monitor specific types of events that occur on a client system 212. As shown in FIG. 3B, the event log section 314 contains a list of check boxes, each of which represents an option to collect a specific type of event log entry. For example, the types of event log entries can be error 322, audit success 324, audit failure 326, information 328, and warning 330. The event log section 314 also includes a "report all events" check box 332 that allows for reporting all existing events in an event log, regardless of its event type.

The configuration UI 206 further includes a PerfMon section 334 (FIG. 3A, details not shown) for setting configurations to collect performance-related data exposed through one or more performance counters registered on a client system 306. In an exemplary embodiment of the invention, the PerfMon section 334 lists all registered performance counters from which a user may select one or all of them to collect metric data on.

The configuration UI 206 also contains a PoolTags section 336 (FIG. 3A, details not shown) that sets configurations to collect memory usage information for various drivers in the client system 212 by using their corresponding PoolTags. As known by those of ordinary skill in the art and other related fields, a driver PoolTag identifies how a driver in a client system uses available computer resources such as computer memory. In an exemplary embodiment of the invention, the PoolTags section 336 lists all available PoolTags along with their descriptions; a user may select to exclude or include specific PoolTags for data collection.

The configuration UI 206 further contains a process section 338 (FIG. 3A, details not shown) that allows a user to set configurations for collecting information about various processes in the client system 212. In an exemplary embodiment of the invention, the process section 338 identifies available processes that a user may choose to collect metric data on.

In some embodiments of the invention, the configuration UI 206 may be extended by a configuration user interface provided by an IPF UI plug-in (hereinafter "IPF configuration UI"). The IPF configuration UI allows a user to specify thresholds for one or more metrics so as to determine whether the corresponding metric task has succeeded or failed according to the thresholds at run time of one or more client systems 212.

Figure 4:
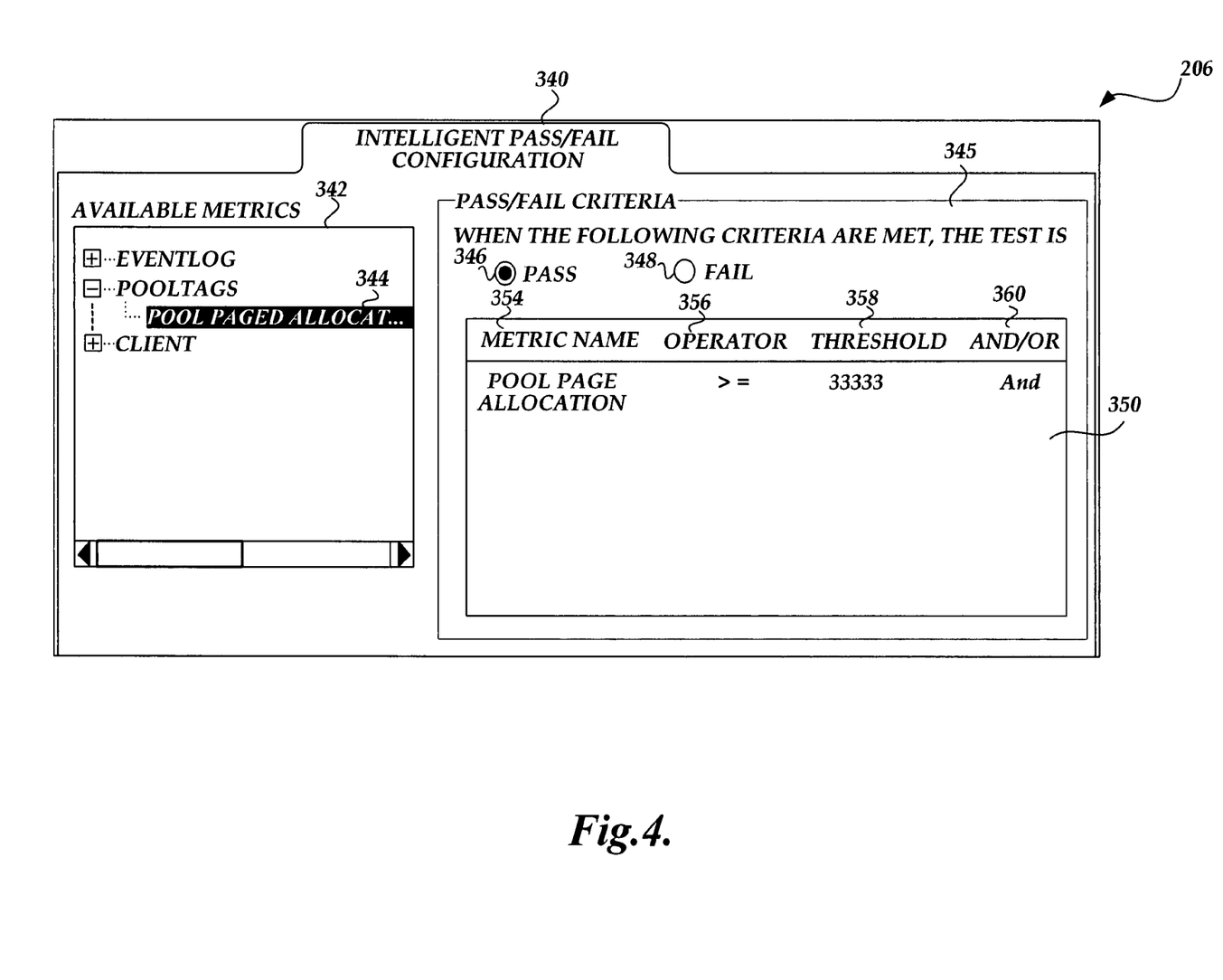
FIG. 4 is a pictorial diagram illustrating an exemplary user interface provided by an IPF UI plug-in for configuring an IPF client plug-in that monitors run time performance of a metric.

FIG. 4 illustrates one exemplary IPF configuration UI 340. The IPF configuration UI 340 contains a preview panel 342 displaying all available metrics that have been selected in the various configuration UI 206 sections previously discussed. For example, as shown in FIG. 4, a "pool paged allocation" metric 344 is selected in the PoolTags section 336 (FIG. 3A).

The IPF configuration UI 340 further contains a "Pass/Fail Criteria" panel 345. The "Pass/Fail Criteria" panel 345 includes a "pass" radio button 346, a "fail" radio button 348, and a criterion list view 350 that lists one or more criteria used to judge whether a metric task that the selected metric concerns fails or succeeds. A criterion defines a threshold for a given metric. If the "pass" radio button 346 is selected, the criteria in the criterion list view 350 are used to judge whether the metric task has succeeded. If the "fail" radio button 348 is selected, the criteria in the criterion list view 350 are used to judge whether the metric task has failed.

In an exemplary implementation of the criterion list view 350, each criterion entry in the criteria list view 350 identifies the name 354 of the selected metric. The entry also identifies an operator 356 that is used for measuring the selected metric against a threshold 358 at run time. The operator 356 can be ">", "≧", "<", "≦", "=", and "!=", etc. The entry specifies the threshold 358 for judging whether the metric task has succeeded or failed. In an exemplary embodiment of the invention, the threshold 358 is a numerical value. For example, in FIG. 4, the threshold value 358 is set to be 33333. The entry may further include a logical operator 360 that is used to join multiple criteria. The logical operator 360 can either be an "AND" or an "OR."

As noted above, the data collection module 208 collects and reports all the required metric data from one or more client systems 212 according to the settings specified in the configuration module 202, preferably along with one or more component specific schema defined in one or more component specific plug-ins 210. Preferably, the data collection module 208 formats all the collected metric data appropriately, for example, into an XML format. The collected metric data is then packed into a database message and is transported via a communication layer 216 to the central metrics storage module 218.

More specifically, the data collection module 208 collects metrics based on the settings in the configuration file 204. For example, the data collection module 208 collects all events according to the one or more event types specified in the configuration file 204. For instance, if the configuration file 204 specifies to collect metrics on events of types such as error 322 and audit success 324, the data collection module 208 collects all events with types matching "error" and "audit success." Unless the configuration file 204 specifies to "report all events" 332 (FIG. 3B), the data collection module 208 will only report new events that have been generated after the data collection module 208 is activated.

In an exemplary embodiment of the invention, the data collection module 208 includes a specific identification (number or otherwise) within the metric data sent to the central metrics storage module 218. The identification may include items such as machine name or other hardware/software based identification mechanism that will allow the analysis component 220 to access data specific to a machine or a collection of machines from the central metrics storage module 218.

As mentioned before, exemplary embodiments of the invention support one or more component specific plug-ins 210. A component specific plug-in 210 extends and customizes the framework 200. It provides a set of interfaces that different components development teams can implement to extend and customize the framework 200 to support a component's specific characteristics.

Embodiments of the invention support at least three types of component specific plug-ins. FIG. 5 is a block diagram illustrating the three types of component specific plug-ins 210 supported by an exemplary embodiment of the invention. The first is a configuration UI plug-in 502. The configuration UI plug-in 502 extends and customizes the configuration UI 206 to create, add, and update custom configuration data concerning one or more metrics for a component.

The second type of component specific plug-ins 210 is a data collection plug-in 504 that extends and customizes the data collection module 208. The data collection plug-in 504 receives configuration information from the data collection module 208 and collects custom metric data that is predefined in the data collection plug-in 504. The data collection plug-in 504 then exports the collected metric data to the data collection module 208 for it to transport to the central metrics storage module 218.

The third type of component specific plug-ins 210 is an IPF plug-in. Embodiments of the invention provide two types of IPF plug-in: an IPF client plug-in 506 and an IPF UI plug-in 508. An IPF client plug-in 506 is loaded into the data collection module 208 during run time and monitors the actual metrics collected at run time to ensure they are within one or more defined criteria. The IPF UI plug-in 508 is loaded into the configuration UI 206 to enable a user to customize the settings for the IPF client plug-in 506. The above-discussed FIG. 4 provides one exemplary user interface provided by an IPF UI plug-in 508.

If a metric is associated with at least one IPF client plug-in 506, the data collection module 208 will pass the current metric data it collects to the IPF client plug-in 506 before the data collection module 208 sends the updated metric data to the central metrics storage module 218. The IPF plug-in 506 decides whether the collected metric data meet one or more criteria, for example, specified by a user through the configuration UI 206 (FIG. 4). If the IPF client plug-in 506 returns a value indicating a pass, the data collection module 208 may log the pass result in the appropriate log file for the metric task and continue the metric task. If the IPF client plug-in 506 returns a value indicating a failure, the data collection module 208 logs the failure result in the appropriate log file for the metric task, exits the metric task, and deletes the metric data without reporting them to the central metrics storage module 218.

Embodiments of the invention allow more than one IPF client plug-in 506 to interact with the data collection module 208. A failure result from any one of the IPF client plug-ins 506 will cause the data collection module 208 to exit the metric task after appropriate logging. The configuration file 204 specifies the order in which each of the multiple IPF client plug-ins 506 analyzes the metric at run time.

Returning to FIG. 2, after collecting metric data according to the specifications in the configuration file 204 and in one or more of the component specific plug-ins 210, the data collection module 208 sends the metric data via a communication layer 216 to the central metrics storage module 218.

In some embodiments of the invention, to allow for more effective and extensible format for storing metric data, metric data is transformed before being stored in the central metrics storage module 218. The transformation is transparent both to the client system 212 and the data collection module 208. In an exemplary embodiment of the invention, the output log file 304 containing metric data in a client system 212 includes a parameter called "group name." The central metrics storage module 218, which can be a database, includes an attribute called "metric name." The transformation process prefixes the "group name" to the "metric name" and the resulting string is stored as the actual "metric name." The following XML text illustrates how metric data provided by the data collection module 208 may be transformed.

The process information 338 (FIG. 3A) as seen in the output log file 304 (FIG. 3A) storing metric data is as follows:

```
< Group Name = "MEMORYINFO\PROCESS" >
< Metric Name =
        "services.exe\ProcessID"Type = "System" > 444 < /Metric >
< Metric Name = "services.exe\HandleCount"Type =
                                "System" > 0 < /Metric >
< Metric Name = "services.exe\WorkingSet"Type =
                                "System" > 17907712 < /Metric >
< Metric Name = "services.exe\VirtualBytes"Type =
                                "System" > 72728576 < /Metric >
< Metric Name = "services.exe\PagedPoolBytes"Type =
                                "System" > 65088 < /Metric >
< Metric Name = "services.exe\NonPagedPoolBytes"Type =
                                "System" > 13880 < /Metric >
           ...
        < /Group >
```

The same information stored in the central metrics storage module 208 after going through the above-mentioned transformation is as follows:

```
<Metric
Name="MEMORYINFO\PROCESS\services.exe\
ProcessID"
    Type="System">444</Metric>
  <Metric
Name="MEMORYINFO\PROCESS\services.exe\Handle-
Count"
    Type="System">0</Metric>
  <Metric
Name="MEMORYINFO\PROCESS\services.exe\Working-
Set"
    Type="System">17907712</Metric>
  <Metric
Name="MEMORYINFO\PROCESS\services.exe\Virtual-
Bytes"
    Type="System">72728576</Metric>
  <Metric
Name="MEMORYINFO\PROCESS\services.exe\Paged-
PoolBytes"
    Type="System">65088</Metric>
  <Metric
Name="MEMORYINFO\PROCESS\services.exe\Non-
PagedPoolBytes"
    Type="System">13880</Metric>
```

After storing various metrics collected at run time in the central metrics storage module 218 in a defined format, some embodiments of the invention provide an analysis component 220. The analysis component 220 can be used to query the central metrics storage module 218 and to analyze the retrieved metric data, both online or offline. The analysis component 202 includes an analysis engine 222. In some embodiments of the invention, the analysis engine 222 provides two interfaces: one for analyzing metric data and one for graphing metric data.

In an exemplary embodiment of the invention, the interface for metric data analysis is named IDataAnalyzer. The public interface IDataAnalyzer includes a method Execute (DataSetList) that performs the actual analysis of the metric data in the DataSetList parameter and stores the analyzed data internally as another DataSetList. The public interface IDataAnalyzer also includes a property named CurrentDataSetList, which stores the analyzed data.

Alternatively, a user may use the graph analyzer interface to provide some form of graphic analysis of metric data stored in the central metrics storage module 218. In an exemplary embodiment of the invention, the graph analyzer interface is named IGraphAnalyzer. The IGraphAnalyzer interface also includes an Execute (DataSetList) method. This method generates the graphs from the input metric data in the DataSetList, and stores the graphs internally as images. In addition, the IGraphAnalyzer interface includes a property named Graph, which allows a user to access the graphs generated from the Execute method.

A DataSetList is an array of DataSet objects. Each DataSet object maps to a specific set of values for a given metric. That is, each DataSet object hosts a set of DataPoints and a set of attributes that go along with the DataPoints. Each DataPoint object maps to a specific value for a given metric. In other words, each DataPoint object holds attributes and data about a single data value of a metric.

In some embodiments of the invention, an enumeration is provided to identify the type of the analyzer. For example, an analyzer can be a statistical data analyzer or a graphical analyzer. Another enumeration may be provided to identify the type of aggregation for a statistical analyzer. For example, the aggregation for a statistic analyzer can be mean, mode, range, or variance. Further, an enumeration may be provided to identify the type of graph for a graphical analyzer. For example, a graph can be a bar graph or a line graph.

Figure 6A:
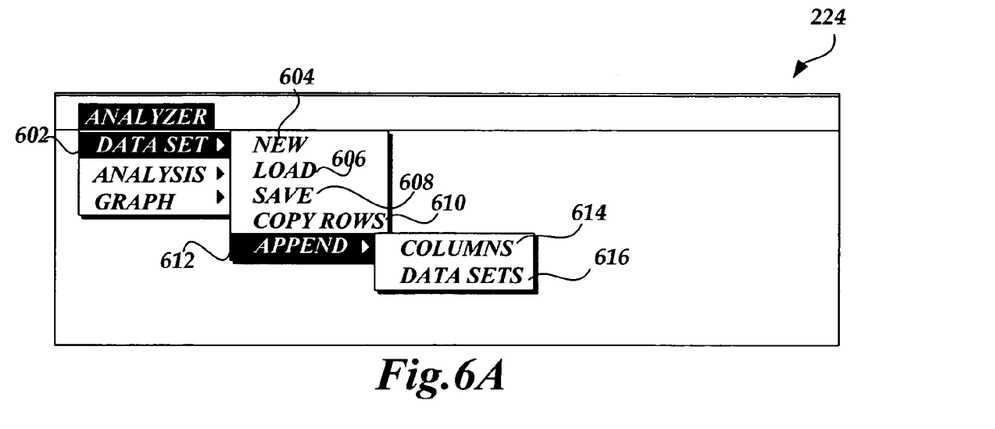
FIGS. 6A–6C are pictorial diagrams illustrating an exemplary analysis UI.
Figure 6B:
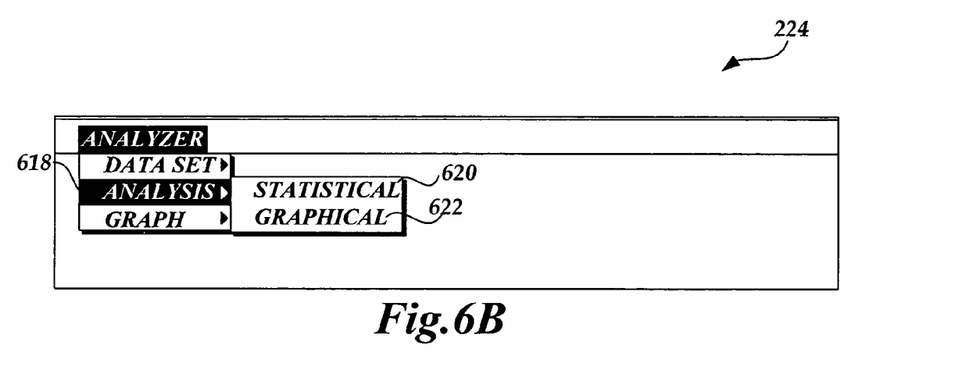
Figure 6C:
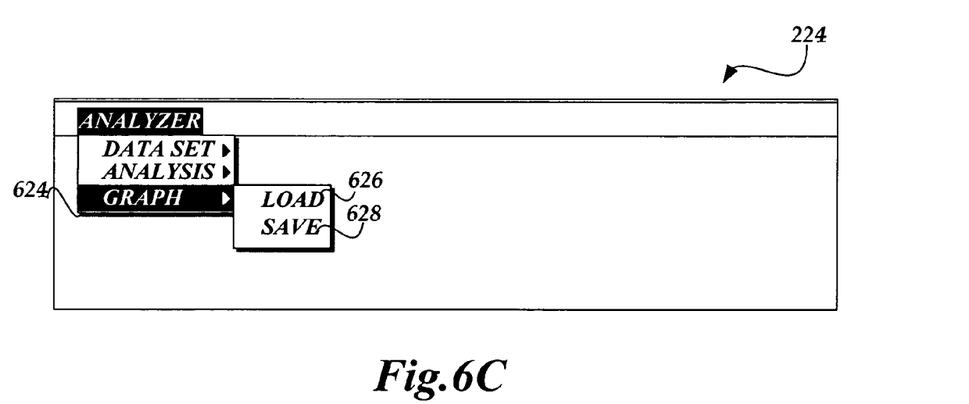

In some embodiments of the invention, the analysis component 220 may further comprise an analysis user interface 224 (hereinafter "analysis UI"). A user may analyze metric data in the central metrics storage module 218 through the analysis UI 224 instead of using the analysis engine 222. FIGS. 6A–6C illustrate an exemplary analysis UI 224. As shown in FIGS. 6A–6C, the analysis UI 224 provides three submenus: data set 602, analysis 618, and graph 624.

The "data set" submenu 602 (FIG. 6A) provides access to various actions that can be performed on the data fetched from the central metrics storage module 218. For example, the data set menu 602 contains action items such as "new" 604, "load" 606, "save" 608, "copy rows" 610, and "append" 612. The "new" 604 action item allows a user to build a custom data set from existing data sets, for example, by either using the existing data sets as they are or merging various existing data sets. The "load" 606 action item allows a user to load a previously saved data set. The "save" 608 action item saves a currently selected data set containing the metric data from the central metrics storage module 218 to a permanent storage for offline analysis or reporting. The "copy rows" 610 action item allows a user to copy only a portion of data from an existing data set to a new data set. The "append" 612 action item allows a user to select the "columns" 614 option to merge one or more columns from one or more data sets into the currently selected data set. The "append" 612 action item also allows a user to select the "data sets" 616 option to merge one or more complete data sets into the currently selected data set.

The analysis submenu 618 (FIG. 6B) enables a user to access analytical actions that can be performed on the data sets fetched from the central metrics storage module 218. For example, the analysis submenu 618 contains a link 620 to a statistical analyzer that allows a user to choose from all available statistical analyzers. A user may select one or more statistical analyzers to run on the current data set. The analysis submenu 618 may also provide a link 622 that allows a user to choose the kind of graphs the user wants to generate for the data set fetched from the central metrics storage module 218.

The graph submenu 624 (FIG. 6C) enables a user to access functions that can be performed on the graphs that are generated from the data set fetched from the central metrics storage module 218. For example, a user can load 626 a graph of a data set. The user can also save 628 the current selected graph to permanent storage for offline analysis or reporting.

Figure 7:
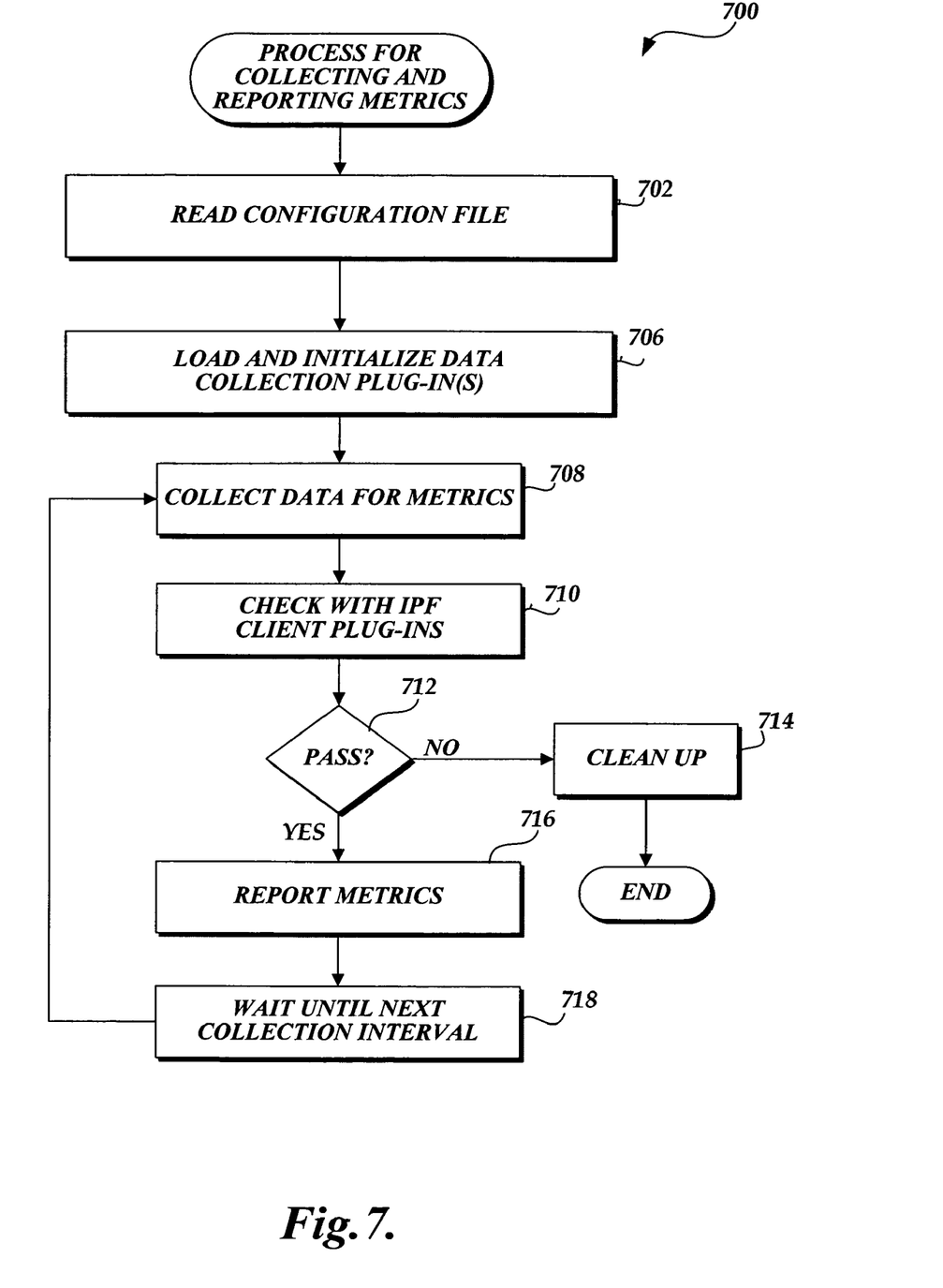
FIG. 7 is a flow diagram illustrating an exemplary process for collecting and reporting one or more metrics.

FIG. 7 is a flow diagram illustrating an exemplary process 700 that collects and reports metric data. In essence, the process 700 reads information in a configuration file and/or one or more component specific plug-ins. The process 700 then collects metric data according to the settings specified in the configuration file and/or the component specific plug-ins. The process further verifies the collected metric data with one or more IPF client plug-ins. In the case that the metric data passed one or more criteria specified by one or more IPF plug-ins, the process 700 reports the metric data to a central metrics storage module.

More specifically, upon receiving a request to collect data for one or more metrics, the process 700 reads a configuration file such as the configuration file 204 illustrated in FIG. 2. See block 702. If the component contains one or more data collection plug-ins, such as the data collection plug-in 504 illustrated in FIG. 5, the process 700 loads and initializes the one or more data collection plug-ins. See block 706. The process 700 then proceeds to collect data for one or more metrics. See block 708. If a metric is associated with one or more IPF client plug-ins, such as the IPF client plug-ins 506 illustrated in FIG. 5, the process 700 passes the collected metric data to check the results returned by the IPF client plug-ins. See block 710. The process 700 determines if the metric data passes the verification by one or more IPF client plug-ins. See decision block 712. If the metric data fails at least one IPF client plug-in verification, the process 700 proceeds to terminate the corresponding metric task and clean up the system, for example, by removing the metric data already collected. See block 714. The process 700 then terminates. If the answer to decision block 712 is YES, then the metric data successfully passes the verification by all involved IPF client plug-ins. The process 700 the proceeds to report the collected metric data to a central metrics storage module, such as the central metrics storage module 218 illustrated in FIG. 2. See block 716. The process 700 then waits for the next data collection interval. See block 718. As noted above in the description of the configuration UI 206, a data collection interval, i.e., report interval, is specified by a user through the configuration UI 206 or in the configuration file 204.

While the preferred embodiment of the invention has been illustrated and described, it will be appreciated that various changes can be made therein without departing from the spirit and scope of the invention.

The invention claimed is:

1. A computer-readable medium having computer-executable modules for collecting and storing at least one metric that describes the operating condition of a computer component over a time interval, comprising:
    a configuration module for configuring a metric in accordance with user input, the metric comprising data concerning the operational condition of a computer component, the data concerning the operational condition of the computer component including normal as well as abnormal operating condition data;
    a data collection module for continuously collecting the metric;
    a central metrics storage module for storing the metric collected by the data collection module; and
    one or more component specific plug-ins that provide custom settings for the computer component that the metric concerns, the component specific plug-in including an item selected from the group consisting of a configuration plug-in, a data collection plug-in, and an IPF plug-in, wherein an IPF plug-in includes: (i) an IPF UI plug-in for setting one or more thresholds on a metric; and (ii) an IPF client plug-in for monitoring the metric at run time and taking appropriate action if the metric falls outside the thresholds; and wherein the data collection module: (i) feeds the metric to the IPF client plug-in; (ii) obtains a result from the IPF client plug-in; (iii) continues collecting the metric if the result is positive; and (iv) stops collecting the metric and removes the metric already collected if the result is negative.

2. The computer-readable medium of claim 1, further comprising an analysis module for analyzing the metric.

3. The computer-readable medium of claim 2, wherein the analysis module further includes an analysis UI.

4. The computer-readable medium of claim 1, wherein the configuration module includes a configuration UI for receiving user input configuration information concerning the metric.

5. A computer-implemented method for collecting and storing at least one metric that describes the operating condition during run time of a client system, comprising:
    configuring a metric in accordance with the user input, the metric comprising data concerning the operating condition of the client system, the data concerning the operating condition of the client system including normal as well as abnormal operating condition data, wherein configuring a metric includes: (i) identifying a log file that records metric information during run time of a client system; (ii) specifying the time interval for storing the metric; and (iii) specifying the metric;
    collecting the metric during run time of the client system, at specified time intervals; and
    storing the collected metric in a way that allows the metric to be analyzed and compared to metrics from other similar client systems.

6. The computer-implemented method of claim 5, further comprising monitoring the metric when collecting the metric.

7. The computer-implemented method of claim 5, further comprising analyzing the metric.

8. The computer-implemented method of claim 7, wherein analyzing the metric includes analyzing the metric along with one or more other metrics.

9. The computer-implemented method of claim 7, wherein analyzing the metric includes graphing the metric along with one or more other metrics.

10. The computer-implemented method of claim 5, wherein specifying the metric includes selecting an information item from the group consisting of:
    events contained in an event log file on the client system;
    available performance counters on the client system;
    available data on drivers on the client system; and
    available processes on the client system.

11. The computer-implemented method of claim 5, wherein configuring a metric further includes receiving component specific information.

12. The computer-implemented method of claim 5, wherein storing the metric includes transforming the metric to a predefined format before storing the metric.

13. The computer-implemented method of claim 5, wherein all metric data are stored in one location.

14. A computer-implemented method for collecting and storing at least one metric that describes the operating condition during run time of a client system, comprising:
    configuring a metric in accordance with the user input, the metric comprising data concerning the operating condition of the client system, the data concerning the operating condition of the client system including normal as well as abnormal operating condition data;
    collecting the metric during run time of the client system, at specified time intervals;
    storing the collected metric in a way that allows the metric to be analyzed and compared to metrics from other similar client systems; and
    monitoring the metric when collecting the metric, monitoring the metric when collecting the metric including using one or more IPF client plug-ins to verify the metric.

15. The computer-implemented method of claim 14, further comprising:
    stopping collection of the metric if at least one IPF client plug-in returns a negative result; and
    continuing collection of the metric if the IPF client plug-in returns a positive result.

* * * * *